(12) United States Patent
Tate

(10) Patent No.: US 12,393,409 B2
(45) Date of Patent: Aug. 19, 2025

(54) SOFTWARE DEVELOPMENT DEVICE AND SOFTWARE DEVELOPMENT PROGRAM

(71) Applicant: connectFree Corporation, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 0 days.

(21) Appl. No.: 17/615,043

(22) PCT Filed: May 25, 2020

(86) PCT No.: PCT/JP2020/020542
§ 371 (c)(1),
(2) Date: Nov. 29, 2021

(87) PCT Pub. No.: WO2020/241571
PCT Pub. Date: Dec. 3, 2020

(65) Prior Publication Data
US 2022/0229642 A1    Jul. 21, 2022

(30) Foreign Application Priority Data
May 31, 2019    (JP) ................................. 2019-103139

(51) Int. Cl.
*G06F 8/41* (2018.01)
*G06F 8/36* (2018.01)

(52) U.S. Cl.
CPC .............. *G06F 8/447* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 10,229,404 B1* | 3/2019 | Cox | G07F 7/1025 |
| 10,679,212 B2* | 6/2020 | Hayhow | G06Q 20/3829 |
| 2006/0173585 A1 | 8/2006 | Hanzawa | |
| 2009/0063611 A1* | 3/2009 | Igarashi | G06F 8/65 |
| | | | 709/201 |

(Continued)

FOREIGN PATENT DOCUMENTS

| | | |
|---|---|---|
| CN | 106030538 A | 10/2016 |
| CN | 109002721 A | 12/2018 |

(Continued)

OTHER PUBLICATIONS

Translation of JP-6207782, Japan Platform for Patent Information, retrieved Mar. 25, 2023. (Year: 2018).*

(Continued)

*Primary Examiner* — Ryan D. Coyer
(74) *Attorney, Agent, or Firm* — Merchant & Gould P.C.

(57) ABSTRACT

A software development device enables software to be shared between controllers using semiconductor devices having different specifications. The software development device generates an execution code executed by a controller having one or more pads from a source code. The software development device includes an analysis module for analyzing the source code to extract a designation for the one or more pads; and a generation modules for generating an execution code including a code corresponding to the extracted designation for the pads with reference to hardware of a target controller.

18 Claims, 12 Drawing Sheets

(56) References Cited

U.S. PATENT DOCUMENTS

| | | | |
|---|---|---|---|
| 2010/0225516 A1* | 9/2010 | Ishibuchi | ........ G06F 3/05 |
| | | | 341/126 |
| 2011/0209128 A1 | 8/2011 | Nikara et al. | |
| 2014/0225275 A1 | 8/2014 | Shimizu | |

FOREIGN PATENT DOCUMENTS

| | | | |
|---|---|---|---|
| JP | H02-137764 A | | 11/1990 |
| JP | 2006-213145 A | | 8/2006 |
| JP | 2010-206424 A | | 9/2010 |
| JP | 2014154800 A | | 8/2014 |
| JP | 2016026385 A | | 2/2016 |
| JP | 6207782 B1 | * | 10/2017 |
| JP | 2018-018498 A | | 2/2018 |
| WO | 2015/124116 A2 | | 8/2015 |

OTHER PUBLICATIONS

Lee et al., "SoEasy: A Software Framework for Easy Hardware Control Programming for Diverse IoT Platforms," Sensors 2018, 18(7), 2162; https://doi.org/10.3390/s18072162. (Year: 2018).*

International Search Report for PCT/JP2020/020542 (Aug. 4, 2020).

Lee Junyoung et al., "SoEasy : A Software Framework for Easy Hardware Control Programming for Diverse IoT Platforms" Sensors, vol. 18, No. 7: 2162 (2018).

Search Report for European Patent Application No. 20814469.1 (May 3, 2023).

Office Action for Taiwanese Patent Application No. 109117815 (Aug. 15, 2023).

Japanese Decision to Grant received for JP Application No. 2023-188125 on Nov. 1, 2024, 5 pgs.

* cited by examiner (A) (B)

| PIN NUMBER | LOGICAL PORT | PAD NUMBER |
|---|---|---|
| 5 | I/O_01 | 1 |
| 6 | I/O_02 | 2 |
| 7 | I/O_03 | 3 |
| 14 | I/O_06 | 4 |
| 13 | I/O_05 | 5 |
| 12 | I/O_04 | 6 |

(B)

| PIN NUMBER | LOGICAL PORT | PAD NUMBER |
|---|---|---|
| 22 | I/O_06 | 1 |
| 21 | I/O_05 | 2 |
| 20 | I/O_04 | 3 |
| 19 | I/O_03 | 4 |
| 18 | I/O_02 | 5 |
| 17 | I/O_01 | 6 |

FIG.7

(A)
```
#include <znIOlib.h>
include <znCommunication.h> void main( )
{
    str Message              // TRANSMISSION MESSAGE          -- 1121
    str OutputPort1;         // OUTPUT PORT 1  ⎫
    str OutputPort2;         // OUTPUT PORT 2  ⎭              -- 1122
    ...
    Message = getText();     // DETERMINATION OF TRANSMISSION MESSAGE  -- 1123
    ...
    OutputPort1 = "IO_05"    ⎫
    Set OutputPort1 as "Out" ⎪
    OutputPort2 = "IO_04"    ⎬                                -- 1124A
    Set OutputPort2 as "Out" ⎭
    PutText(Message, OutputPort1, OutputPort2);  // MESSAGE OUTPUT  -- 1125
    ...
}
```
— 112A (B)
```
#include <znIOlib.h>
include <znCommunication.h> void main( )
{
    str Message              // TRANSMISSION MESSAGE          -- 1121
    str OutputPort1;         // OUTPUT PORT 1  ⎫
    str OutputPort2;         // OUTPUT PORT 2  ⎭              -- 1122
    ...
    Message = getText();     // DETERMINATION OF TRANSMISSION MESSAGE  -- 1123
    ...
    OutputPort1 = "IO_02"    ⎫
    Set OutputPort1 as "Out" ⎪
    OutputPort2 = "IO_01"    ⎬                                -- 1124B
    Set OutputPort2 as "Out" ⎭
    PutText(Message, OutputPort1, OutputPort2);  // MESSAGE OUTPUT  -- 1125
    ...
}
```
— 112B

FIG.8

```
#include <znIOlib.h>
include <znCommunication.h> void main( )
{
    str Message              // TRANSMISSION MESSAGE              ~1121
    unsigned int ActivePad1;  // USED PAD 1  ⎫
    unsigned int ActivePad2;  // USED PAD 2  ⎭                    ~1126
    ...
    Message = getText();     // DETERMINATION OF TRANSMISSION MESSAGE  ~1123
    ...
    ActivePad1 = 5;  ⎫
    ActivePad2 = 6;  ⎭                                            ~1127
    SendText(Message, ActivePad1, ActivePad2);  // MESSAGE OUTPUT ~1128
    ...
}
```

(A)　　　　　　　　　(B)

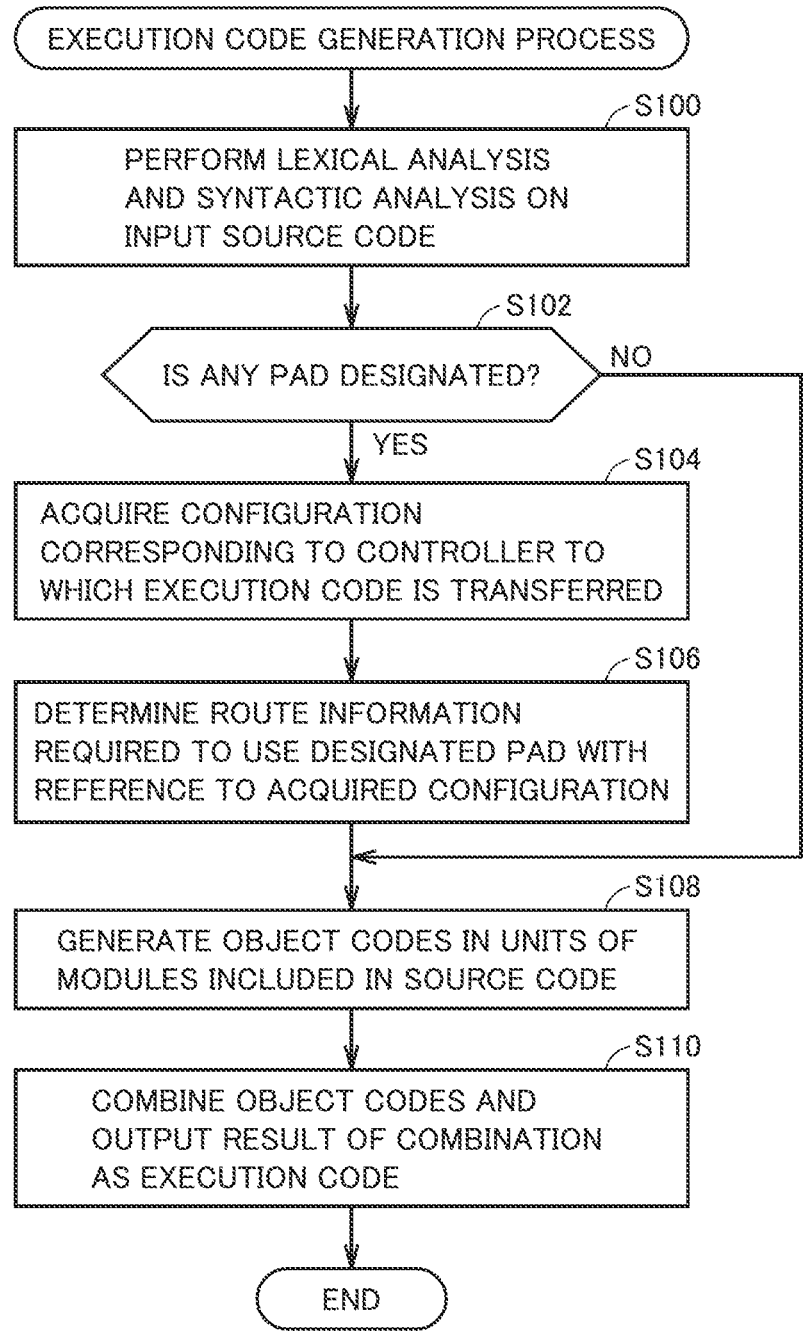

SOFTWARE DEVELOPMENT DEVICE AND SOFTWARE DEVELOPMENT PROGRAM

This application is a National Stage of PCT/JP2020/020542, filed May 25, 2020, which claims priority to Japanese Patent Application No. 2019-103139, filed May 31, 2019, which applications are incorporated herein by reference. To the extent appropriate, a claim of priority is made to each of the above-disclosed applications.

TECHNICAL FIELD

The present disclosure relates to a software development device and a software development program.

BACKGROUND ART

The development of information and communication technology (ICT) has been remarkable in recent years, and devices connected to a network, such as the Internet, are not limited to information processing devices, such as conventional personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

Even in a device used in IoT (also referred to as an "edge device"), various programs are executed using a semiconductor device. Regarding the relationship between such a semiconductor device and software, for example, JP 2006-213145 A discloses a mechanism for sharing software between a plurality of specifications, in which designated terminal pins are different, by using the same ECU in terms of hardware.

CITATION LIST

Patent Document

Patent Document 1: JP 2006-213145 A

SUMMARY OF THE INVENTION

Problem to be Solved by the Invention

The progress of semiconductor devices that make up edge devices is also remarkable. With the improvement of such semiconductor devices, the specifications may be changed, and problems such as how to maintain and manage the software may arise.

The mechanism disclosed in Patent Document 1 described above is intended to realize a plurality of functions having different specifications with single software by using the same hardware, but does not solve sharing the same software between a plurality of semiconductor devices having different specifications.

One object of the present disclosure is to provide a solution that enables software to be shared between controllers using semiconductor devices having different specifications.

Means for Solving Problem

According to an aspect of the present disclosure, there is provided a software development device that generates an execution code executed by a controller having one or more pads from a source code. The software development device includes: an analysis means for analyzing the source code to extract a designation for the one or more pads; and a generation means for generating an execution code including a code corresponding to the extracted designation for the pads with reference to hardware of a target controller.

The pad may be a physical interface between the controller and arbitrary hardware.

The hardware information may include information for specifying a connection relationship between a pin of a semiconductor device mounted on the controller and the pad.

The designation for the one or more pads may include identification information for specifying a pad to be used among the one or more pads.

The generation means may generate the execution code by using a code unique to the target controller instead of a library module commonly used between controllers.

According to another form of the present disclosure, there is provided a software development program for generating an execution code executed by a controller having one or more pads from a source code. The software development program causes a computer to execute: a step of analyzing the source code to extract a designation for the one or more pads; and a step of generating an execution code including a code corresponding to the extracted designation for the pads with reference to hardware of a target controller.

Effect of the Invention

According to the present disclosure, it is possible to share software between controllers using semiconductor devices having different specifications.

BRIEF DESCRIPTION OF DRAWINGS

FIG. 6 is a diagram showing a connection relationship between the microcomputer and the pad shown in FIG. 5;

FIG. 7 is a diagram showing an example of source code directed to the controller shown in FIGS. 5 and 6;

FIG. 8 is a diagram showing an example of a source code that can be input to the software development device according to the present embodiment;

FIG. 12 is a flowchart showing a processing procedure for generating an execution code from a source code in the software development device according to the present embodiment.

MODE(S) FOR CARRYING OUT THE INVENTION

Figure 1:
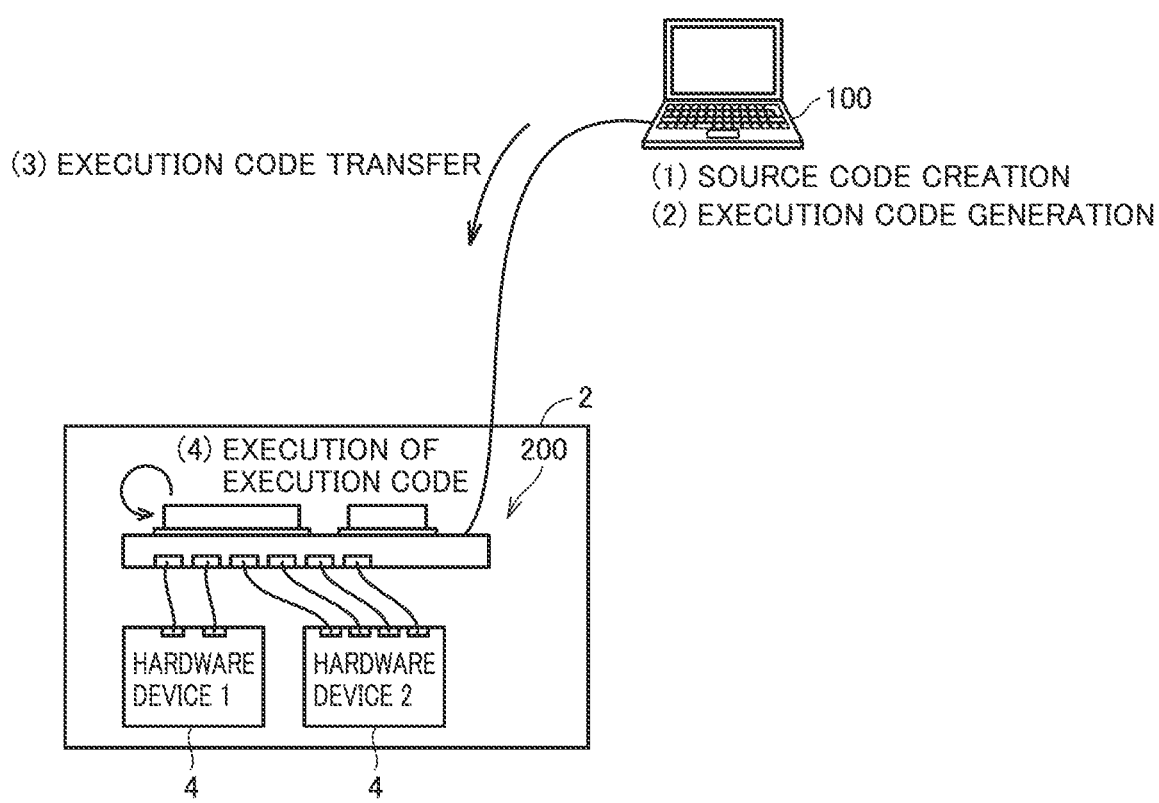
FIG. 1 is a schematic diagram showing an example of the overall configuration of an IoT system according to the present embodiment.

An embodiment according to the present disclosure will be described in detail with reference to the diagrams. In addition, the same or corresponding portions in the diagrams are denoted by the same reference numerals, and the description thereof will not be repeated.

In the following description, as a typical example, a case where a software development device 100 according to the present embodiment is applied to an IoT system will be described. However, the present disclosure can be applied to any system and any controller without being limited to the IoT system.

<A. IoT System 1>

First, the overall configuration of an IoT system 1 including the software development device 100 according to the present embodiment and an edge device 2 will be described.

FIG. 1 is a schematic diagram showing an example of the overall configuration of the IoT system 1 according to the present embodiment. Referring to FIG. 1, in the IoT system 1, typically, a program (execution code) executed by the edge device 2 is generated by the software development device 100. The generated program is transferred from the software development device 100 to a controller 200 included in the edge device 2.

An integrated development environment (IDE) is provided for the software development device 100, so that the user can create an arbitrary program in the integrated development environment.

The edge device 2 may be any device, but typically, factory facilities, various devices in the home, social infrastructure equipment, movable bodies such as vehicles, arbitrary portable devices, and the like are assumed. More specifically, the edge device 2 includes the controller 200 including a processor and one or more hardware devices 4. The hardware device 4 includes any sensor, actuator, communication device, and the like that make up the edge device 2.

The controller 200 and the hardware device 4 are electrically connected to each other by wiring (hard-wired).

As a typical processing procedure in the IoT system 1 shown in FIG. 1, first, the user creates a source code by using the software development device 100 ((1) source code creation). Then, the created source code is compiled in the software development device 100 to generate an execution code ((2) execution code generation). The generated execution code is transferred to the controller 200 of the edge device 2 ((3) execution code transfer). The transferred execution code is executed by the controller 200 ((4) execution of execution code). Any signal may be transmitted to and received from the hardware device 4 by executing the execution code on the controller 200.

In this manner, the software development device 100 generates an execution code executed by the controller 200 from the source code.

<B. Hardware Configuration Example>

Next, a hardware configuration example of a device included in the IoT system 1 according to the present embodiment will be described.

(b1: Software Development Device 100)

The software development device 100 is typically realized by a general-purpose computer.

Figure 2:
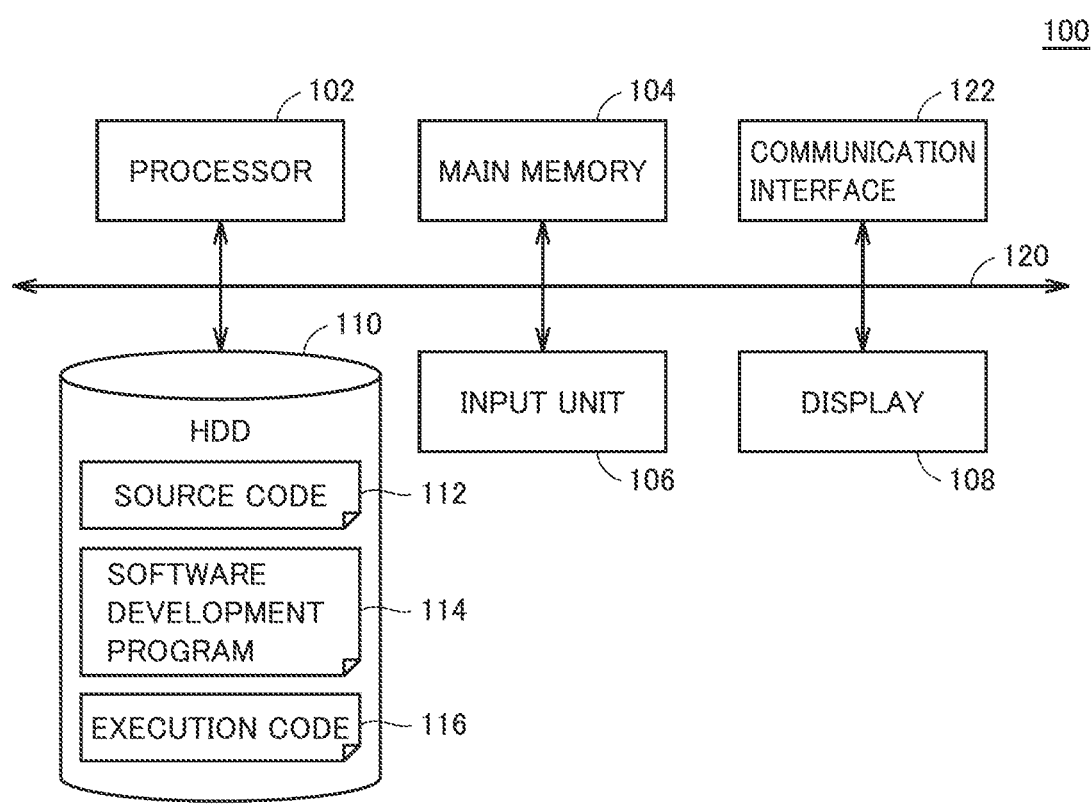
FIG. 2 is a schematic diagram showing a hardware configuration example of a software development device according to the present embodiment.

FIG. 2 is a schematic diagram showing a hardware configuration example of the software development device 100 according to the present embodiment. Referring to FIG. 2, the software development device 100 includes a processor 102, a main memory 104, an input unit 106, a display 108, a hard disk 110, and a communication interface 122 as main components. These components are connected to each other through an internal bus 120.

The processor 102 may be, for example, a CPU (Central Processing Unit) or a GPU (Graphics Processing Unit). A plurality of processors 102 may be disposed, or the processor 102 having a plurality of cores may be adopted.

The main memory 104 is a volatile storage device, such as a DRAM (Dynamic Random Access Memory) or a SRAM (Static Random Access Memory). The hard disk 110 holds various programs executed by the processor 102 or various kinds of data. In addition, instead of the hard disk 110, a non-volatile storage device such as an SSD (Solid State Drive) or a flash memory may be adopted. Among the programs stored in the hard disk 110, a designated program is loaded to the main memory 104, and the processor 102 sequentially executes computer-readable instructions included in the program loaded to the main memory 104 to realize various functions described later.

Typically, the hard disk 110 stores a source code 112 arbitrarily created by the user, a software development program 114 for realizing an integrated development environment, and an execution code 116 generated from the source code 112. The software development program 114 generates the execution code 116 from the source code 112 arbitrarily created by the user, and includes a module that provides a program development environment.

The input unit 106 receives an input operation of the user who operates the software development device 100. The input unit 106 may be, for example, a keyboard, a mouse, a touch panel disposed on a display device, or an operation button disposed on the housing of the software development device 100.

The display 108 displays the processing result of the processor 102 and the like. The display 108 may be, for example, an LCD (Liquid Crystal Display) or an organic EL (Electro-Luminescence) display.

The communication interface 122 is in charge of data exchange with the controller 200. Examples of the communication interface 122 include wired connection terminals, such as serial ports including a USB (Universal Serial Bus) port and an IEEE1394 and a legacy parallel port. Alternatively, the communication interface 122 may include an Ethernet (registered trademark) port.

In addition, the entirety or part of the software development device 100 may be realized by using a hard-wired circuit such as an ASIC (Application Specific Integrated Circuit) in which a circuit corresponding to computer-readable instructions is provided. In addition, the entirety or part of the software development device 100 may be realized by using a circuit corresponding to computer-readable instructions on an FPGA (field-programmable gate array). In addition, the entirety or part of the software development device 100 may be realized by appropriately combining the processor 102, a main memory, an ASIC, an FPGA, and the like.

The software development device 100 may further include a component for reading the stored program or the like from the non-transitory media that stores the software development program 114 including computer-readable instructions. The media may be, for example, an optical medium, such as a DVD (Digital Versatile Disc), or a semiconductor medium, such as a USB memory.

In addition, the software development program 114 may not only be installed on the software development device 100 through the media, but also be provided from a distribution server on the network.

(b2: Controller 200)

The controller 200 may be realized by using a general-purpose computer, or may be realized by using a semiconductor substrate including components necessary for realizing processing.

Figure 3:
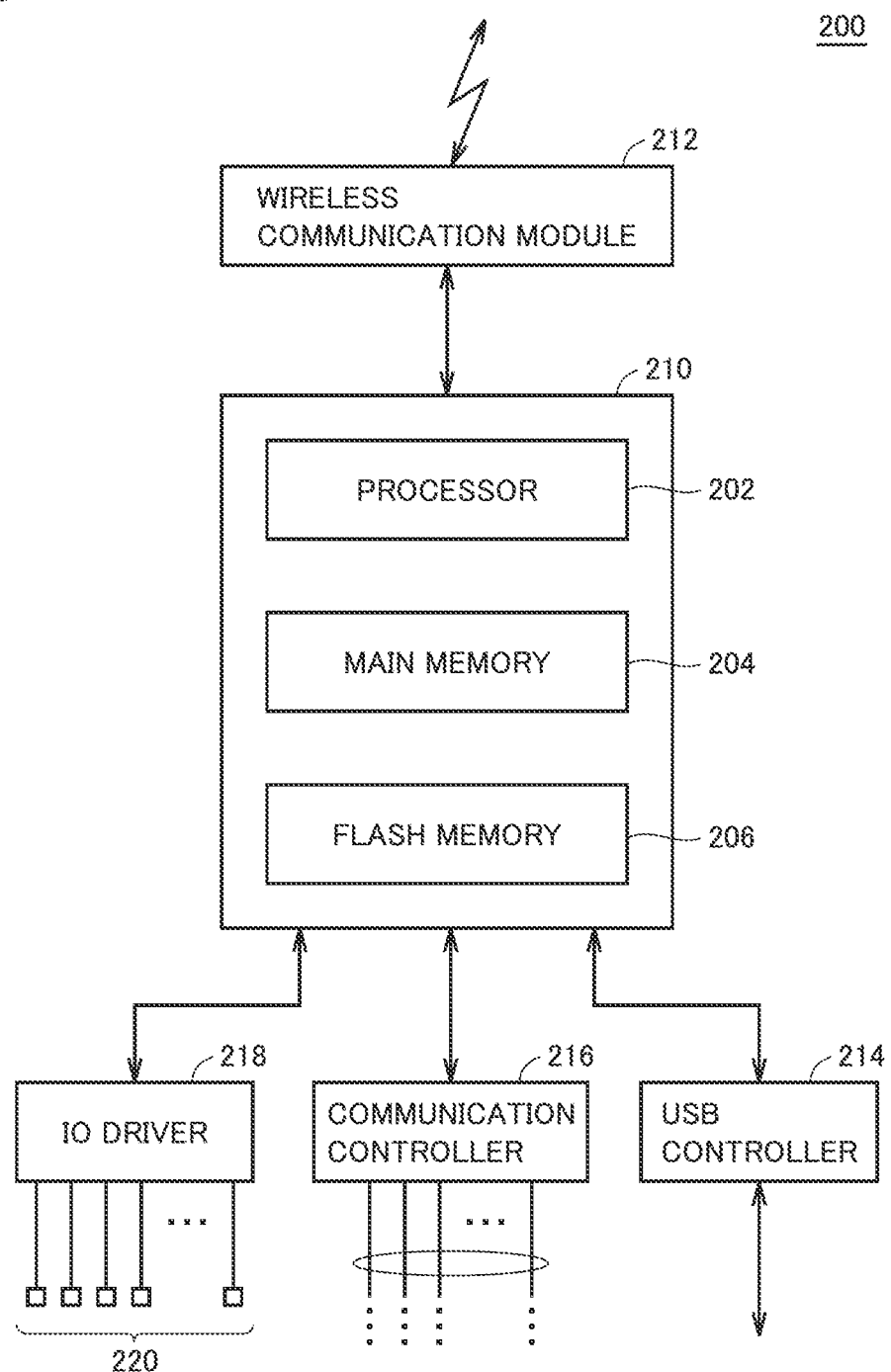
FIG. 3 is a schematic diagram showing a hardware configuration example of a controller according to the present embodiment.

FIG. 3 is a schematic diagram showing a hardware configuration example of the controller 200 according to the present embodiment. Referring to FIG. 3, the controller 200 includes, as main components, an arithmetic processing unit 210, a wireless communication module 212, a USB controller 214, a communication controller 216, and a microcomputer 218 including an IO driver electrically connected to one or more pads 220.

The arithmetic processing unit 210 is a calculation unit that executes a program, and includes a processor 202, a main memory 204, and a flash memory 206 as main components. The processor 202 is, for example, a CPU or a GPU. A plurality of processors 202 may be disposed, or the processor 202 having a plurality of cores may be adopted. The main memory 204 is a volatile storage device, such as a DRAM or an SRAM. The flash memory 206 is a nonvolatile storage device that holds a program executed by the processor 202 or necessary data. Among the programs stored in the flash memory 206, a designated program is loaded to the main memory 204 and executed by the processor 202 to realize various functions.

The wireless communication module 212 is in charge of wireless data exchange with any other device. The wireless communication module 212 may include processing circuits and antennas for wireless communication with devices, routers, mobile base stations, and the like. The wireless communication supported by the wireless communication module 212 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

The USB controller 214 is in charge of data exchange with the software development device 100. The communication controller 216 is in charge of wired data exchange with any other device. The communication controller 216 may be compatible with known data exchange methods, such as serial communication, parallel communication, and GPIO (General-purpose input/output).

The microcomputer 218 is in charge of transmitting and receiving electrical signals to and from an arbitrary device electrically connected through the pad 220. The microcomputer 218 outputs an electrical signal according to a command from the arithmetic processing unit 210. In addition, the microcomputer 218 detects an electrical signal given through the pad 220 and outputs the detection result to the arithmetic processing unit 210. More specifically, the microcomputer 218 is configured to include a signal generation circuit, a signal detection circuit, a buffer circuit, and the like.

The pad 220 has a conductor disposed so as to be exposed, and corresponds to a physical interface between the controller 200 and various kinds of hardware.

The controller 200 may be driven by electric power from a battery (not shown).

<C. Problems and Solutions>

Next, a problem to be solved by the software development device 100 according to the present embodiment will be described.

Figure 4:
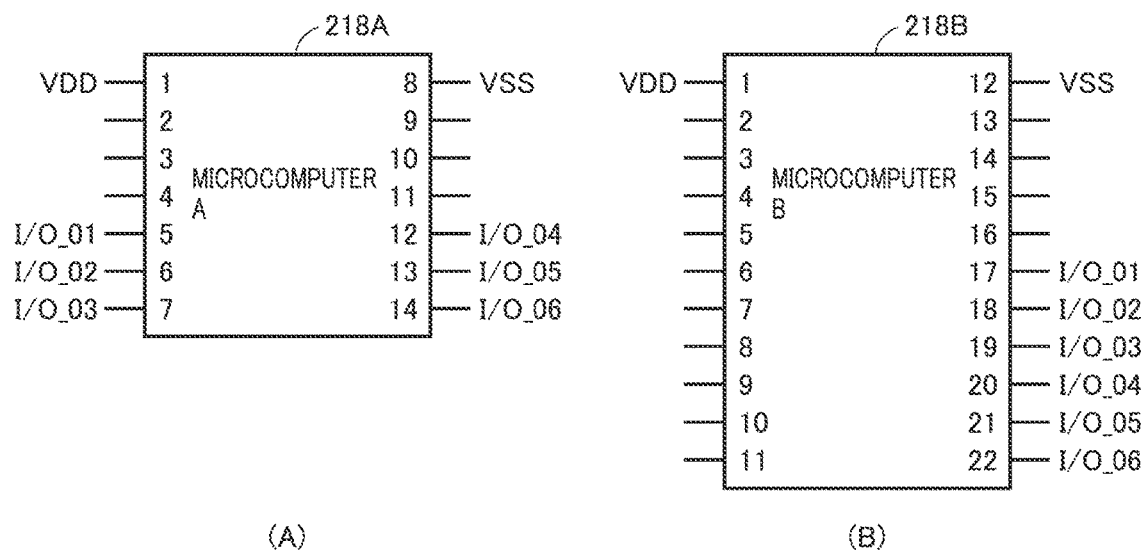
FIG. 4 is a diagram for describing a microcomputer used in a controller connected to the software development device according to the present embodiment.

FIG. 4 is a diagram for describing the microcomputer 218 used in the controller 200 connected to the software development device 100 according to the present embodiment. FIGS. 4(A) and 4(B) exemplify a case where a microcomputer 218A is adopted and a case where a microcomputer 218B is adopted, respectively.

As shown in FIG. 4, even if the microcomputer 218 provides substantially the same function, the specifications (size or the number of pins) of the microcomputer 218 itself and the pin positions to which the respective functions are assigned may be different.

For example, in the microcomputer 218A shown in FIG. 4(A), pins of numbers "5", "6", "7", "12", "13", and "14" are used as terminals for I/O. In addition, in the microcomputer 218B shown in FIG. 4(B), pins of numbers "17", "18", "19", "20", "21", and "22" are used as terminals for I/O.

Figure 5:
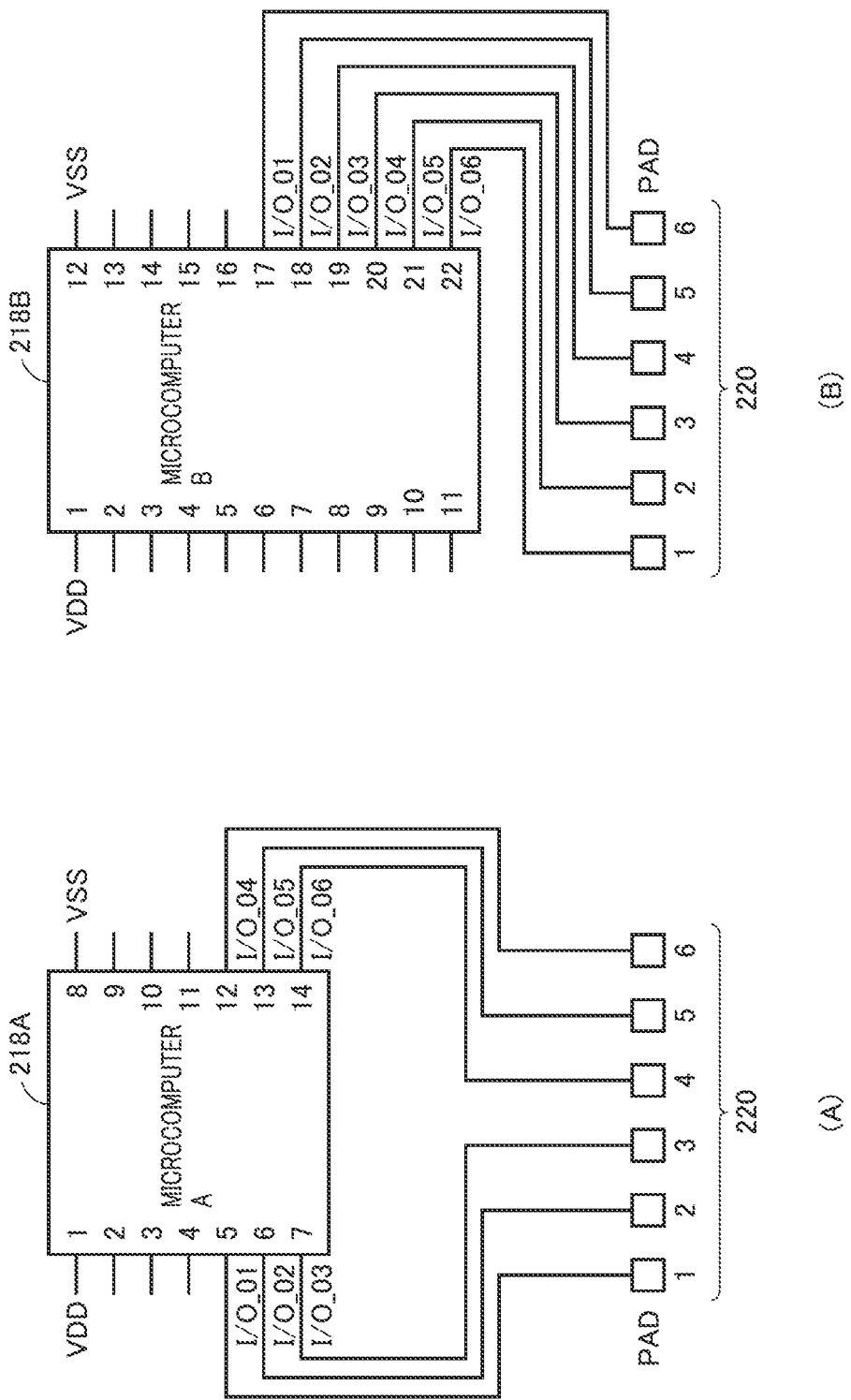
FIG. 5 is a diagram for describing a pad provided in the controller connected to the software development device according to the present embodiment.

FIG. 5 is a diagram for describing the pad 220 provided in the controller 200 connected to the software development device 100 according to the present embodiment. As shown in FIG. 5, the terminal of the microcomputer 218 and the pad 220 are electrically connected to each other. Any combination is possible depending on the positional relationship between the terminal of the microcomputer 218 and the pad 220.

FIG. 5(A) shows a configuration example using the microcomputer 218A shown in FIG. 4(A). In this configuration example, the pads 220 of numbers "1" to "6" are electrically connected to the pins of numbers "5", "6", "7", "14", "13", and "12", respectively. In addition, FIG. 5(B) shows a configuration example using the microcomputer 218B shown in FIG. 4(B). In this configuration example, the pads 220 of numbers "1" to "6" are electrically connected to the pins of numbers "22", "21", "20", "19", "18", and "17", respectively.

FIG. 6 is a diagram showing a connection relationship between the microcomputer and the pad shown in FIG. 5. FIG. 6(A) shows the connection relationship shown in FIG. 5(A), and FIG. 6(B) shows the connection relationship shown in FIG. 5(B).

As can be seen by comparing FIG. 6(A) with FIG. 6(B), between the microcomputer 218A and the microcomputer 218B, both the pin numbers and the logical ports connected to the pads 220 of numbers "1" to "6" are different.

Due to such a difference in hardware, it has been difficult to standardize the software executed by the controller 200 in the known art.

FIG. 7 is a diagram showing an example of the source code 112 directed to the controller 200 shown in FIGS. 5 and 6. Source codes 112A and 112B shown in FIG. 7 define processing when a signal indicating a predetermined message is output through the pads 220 of numbers "5" and "6".

More specifically, the source code 112A shown in FIG. 7A includes a definition 1121 of a variable indicating a message and a definition 1122 of a variable (OutPort1 and OutPort2) indicating an output port. The value of the message is set by a function getText( ) (instruction 1123).

In addition, a port connected to the pad 220 used to transmit a signal indicating the message is enabled (instruction 1124A). The instruction 1124A sets the logical ports "IO_05" (OutPort1: pin number "13") and "IO_04" (OutPort2: pin number "12") of the microcomputer 218A to "Out" (output) (see FIG. 6(A)).

Then, by executing an instruction 1125, a signal indicating a message is transmitted from the two set logical ports.

On the other hand, in the configuration using the microcomputer 218B, the pads 220 of numbers "5" and "6" are electrically connected to the logical ports "IO_02" (pin number "18") and "IO_01" (pin number "6") of the microcomputer 218B. Therefore, it is necessary to reflect this configuration difference in the source code 112.

Specifically, the instruction 1124B shown in FIG. 7B enables a logical port different from the instruction 1124A shown in FIG. 7A. The instruction 1124B sets the logical ports "IO_02" (OutPort1: pin number "18") and "IO_01" (OutPort2: pin number "17") of the microcomputer 218B to "Out" (output) (see FIG. 6(B)).

Thus, it may be necessary to modify the source code 112 each time the specifications of the microcomputer 218 used in the controller 200 are changed.

For such a problem, in the software development device 100 according to the present embodiment, it is possible to directly specify the pad 220 electrically connected to an arbitrary device.

FIG. 8 is a diagram showing an example of the source code 112 that can be input to the software development device 100 according to the present embodiment. The source code 112 shown in FIG. 8 defines processing when a signal indicating a predetermined message is output through the pads 220 of numbers "5" and "6", similarly to the source codes 112A and 112B shown in FIG. 7.

More specifically, the source code 112 shown in FIG. 8 includes a definition 1121 of a variable indicating a message and a definition 1126 of a variable (ActivePad1 and ActivePad2) indicating a pad to be used. The definition 1126 corresponds to the designation of the controller 200 for the pad 220, and includes identification information (in this example, a pad number) for specifying a pad to be used among one or more pads 220.

The value of the message is set by a function getText( ) (instruction 1123).

In addition, information that specifies the pad 220 used to transmit a signal indicating a message is set (instruction 1127). The instruction 1127 sets "5" and "6", which are identification information of the pad 220 to be used, in variables ActivePad1 and ActivePad2, respectively.

Then, by executing an instruction 1128, a signal indicating a message is transmitted from the two set pads 220.

Thus, in the software development device 100 according to the present embodiment, it is possible to create the source code 112 that specifies a pad that is actually connected to the device, and by specifying the pad in this manner, it is possible to abstract the difference in specifications of the microcomputer and the like mounted on the controller 200. That is, even if the specifications of the microcomputer and the like mounted on the controller 200 are changed, the same software can be used as it is.

By adopting such a programming configuration, there is an advantage that the user of the controller 200 can use the software assets continuously without being aware of the hardware specifications and the like. In addition, even if the specifications of the microcomputer and the like to be used are changed, as long as the manufacturer or vendor of the controller 200 designs the internal wiring so as to satisfy the requirements set in advance for each pad, no changes or modifications to the source code will occur.

<D. Functional Configuration of Software Development Device 100>

Next, the functional configuration of the software according to the present embodiment will be described.

Figure 9:
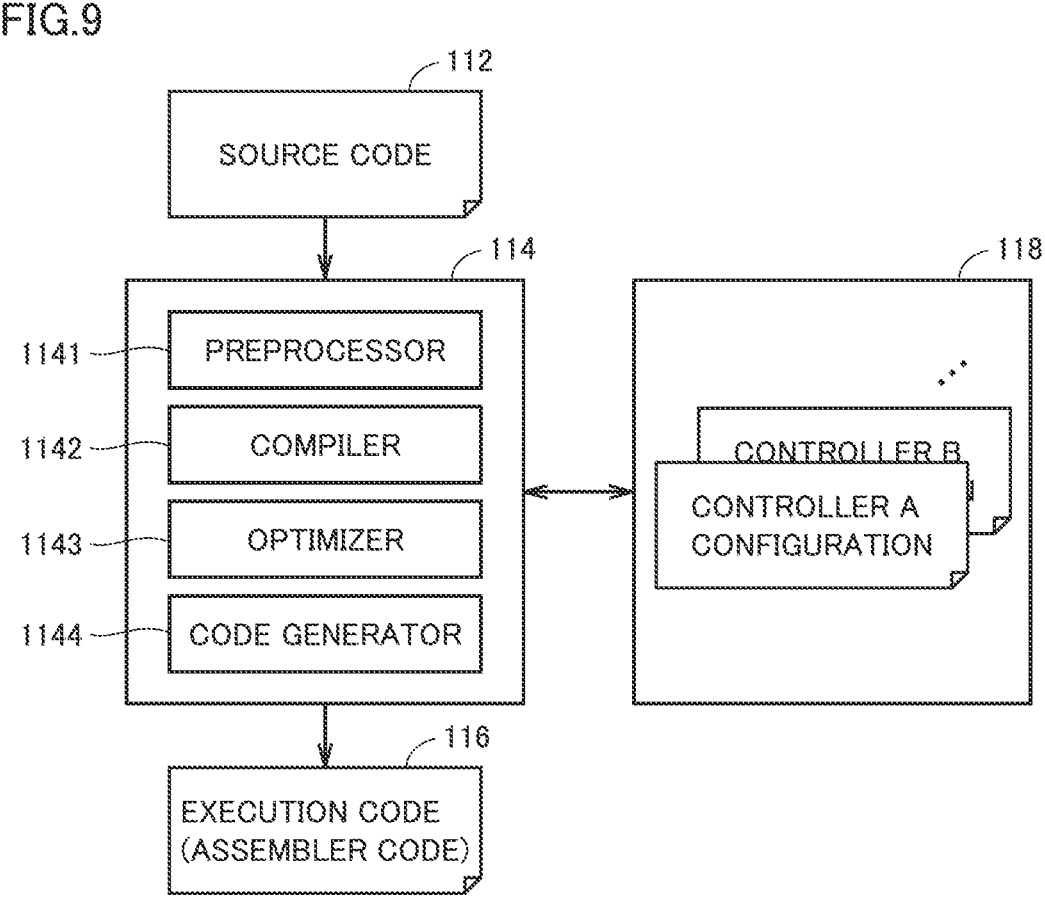
FIG. 9 is a block diagram showing a functional configuration example of the software development device according to the present embodiment.

FIG. 9 is a block diagram showing a functional configuration example of the software development device 100 according to the present embodiment. Each function shown in FIG. 9 is typically realized when the processor 102 of the software development device 100 executes the software development program 114.

Referring to FIG. 9, the software development program 114 receives an input of the source code 112 and generates the execution code 116 (assembler code). More specifically, the software development program 114 includes a preprocessor 1141, a compiler 1142, an optimizer 1143, and a code generator 1144.

The preprocessor 1141 performs lexical analysis and syntactic analysis on the source code 112, and controls the operations of the compiler 1142, the optimizer 1143, and the code generator 1144. The preprocessor 1141 corresponds to an analysis means and analyzes the source code 112 to extract a designation for one or more pads 220.

The compiler 1142 generates an object code based on the results of lexical analysis and syntactic analysis on the source code 112. The optimizer 1143 optimizes the generated object code. The code generator 1144 outputs the final execution code 116 based on the result of optimization by the optimizer 1143.

The compiler 1142, the optimizer 1143, and the code generator 1144 correspond to a generation means, and generate an execution code including a code corresponding to the extracted designation for the pad 220 with reference to the hardware information of the target controller 200.

The software development device 100 has a configuration 118 including the hardware information of the controller 200 on which the execution code 116 is executed. The configuration 118 is prepared for each controller 200, and the configuration 118 corresponding to the target controller 200 is selected.

Typically, the configuration 118 includes information for specifying a pin-pad connection relationship in a semiconductor device (typically, a microcontroller) mounted as shown in FIG. 6. The software development device 100 selects the corresponding configuration 118 according to the type of the controller 200 on which the execution code 116 is executed, and determines route information and the like required to use the pad 220 specified in the source code 112 with reference to the content of the selected configuration 118. That is, the configuration 118 includes setting information for absorbing the difference in the hardware that makes up the controller 200.

The type of the controller 200 may be manually selected by the user, or may be automatically acquired by connecting the software development device 100 and the controller 200 to each other. The configuration 118 may be additionally acquired by the software development program 114 from a server designated in advance, or may be stored in advance in a storage of the controller 200 or the like so that the software development device 100 reads the configuration 118 when necessary.

In addition, the execution code 116 may be generated so as to match the target controller 200.

Figure 10:
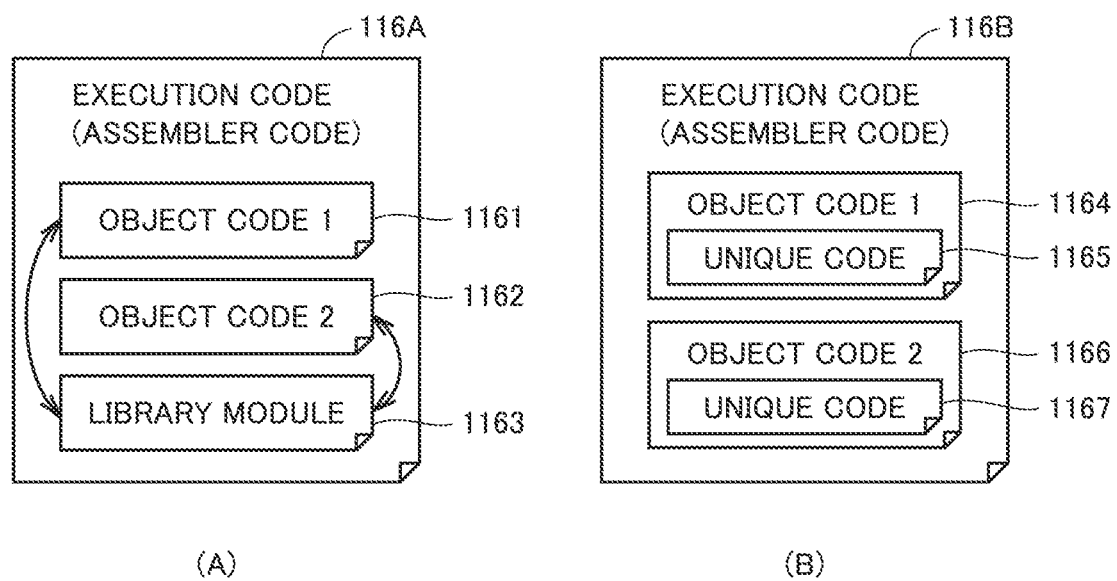
FIG. 10 is a diagram for describing the data structure of an execution code generated by the software development device according to the present embodiment.

FIG. 10 is a diagram for describing the data structure of the execution code 116 generated by the software development device 100 according to the present embodiment. Referring to FIG. 10(A), the execution code 116A includes one or more object codes (in the example of FIG. 10(A), object codes 1161 and 1162) and a required library module 1163. The library module 1163 is a part of an object code referenced by the object codes 1161 and 1162. Typically, necessary data is passed from the object code 1161 or 1162 to the library module 1163 to perform processing, and the result is returned to the object code 1161 or 1162.

On the other hand, in the example shown in FIG. 10(B), codes in charge of the library module 1163 in the execution code 116A shown in FIG. 10A are included in object codes 1164 and 1166 as unique codes 1165 and 1167. That is, the object codes 1164 and 1166 include the unique codes 1165 and 1167 for executing the processing specific to the target controller 200.

Thus, the object codes 1164 and 1166 may include instructions (object codes) generated in accordance with the target controller 200. That is, the software development device 100 may generate the execution code 116 by using the code unique to the target controller 200 instead of the library module 1163 that is commonly used between controllers. By adopting such a configuration, the possibility of the occurrence of an execution error in the controller 200 can be reduced, and an increase in the processing speed can be expected.

<E. Application Example of Pad>

Next, an application example of the pad 220 provided by the controller 200 according to the present embodiment will be described. As described above, in the present embodiment, it is possible to specify one or more pads 220 provided in the controller 200 and execute various processes. By using such a pad 220, it is possible to realize physical interface with various kinds of hardware.

Figure 11:
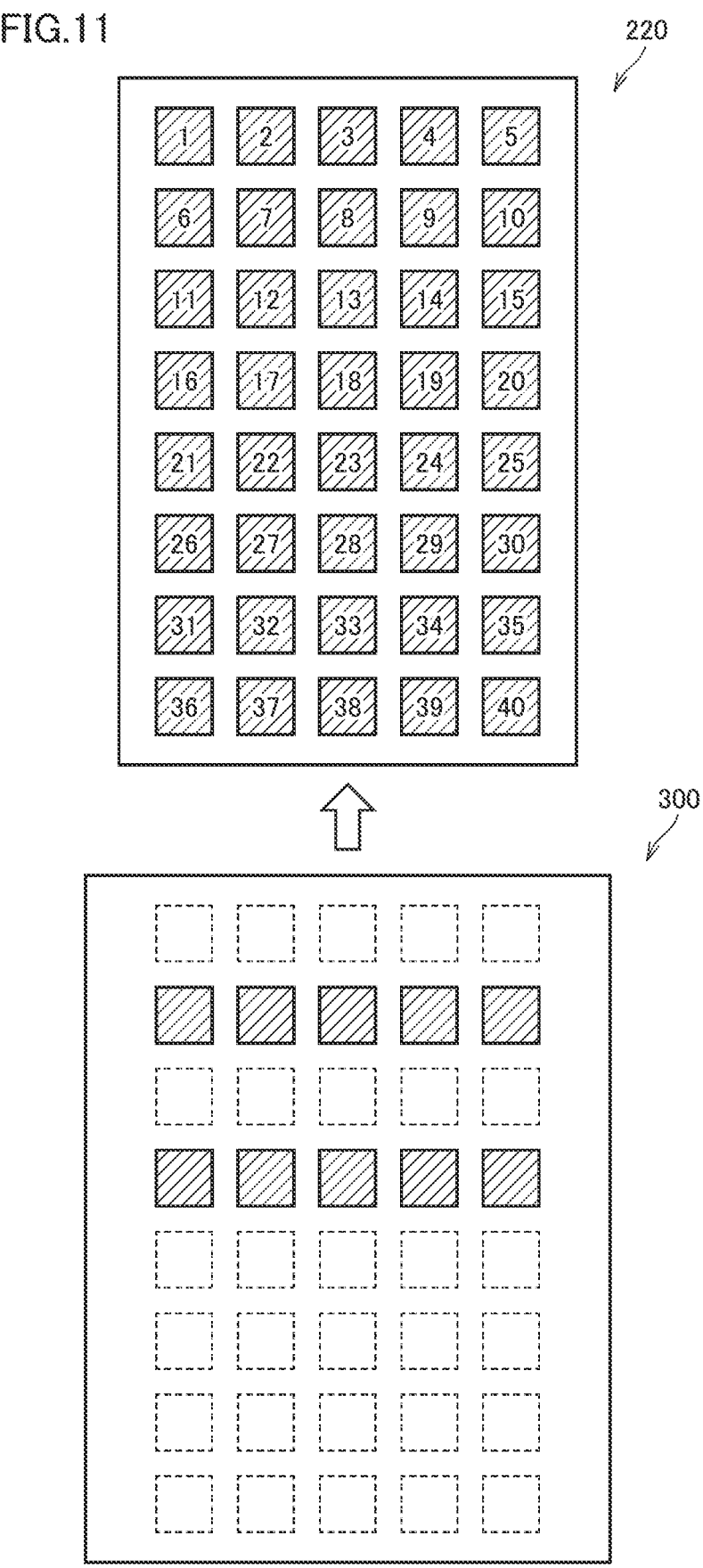
FIG. 11 is a diagram for describing an application example of a pad provided by the controller according to the present embodiment.

FIG. 11 is a diagram for describing an application example of the pad 220 provided by the controller 200 according to the present embodiment. Referring to FIG. 11, the controller 200 has a plurality of pads 220 arranged in a matrix, and an adapter 300 that can be electrically connected to these pads 220 is prepared. In a state in which the adapter 300 is mounted, terminals can be arranged at positions that can be electrically connected to the respective pads 220.

A function may be defined in advance for each of the plurality of pads 220 arranged in a matrix.

FIG. 11 shows an example in which only some pads (numbers "6" to "10" and numbers "16" to "20") among the plurality of pads 220 are used. Any device connected to the adapter 300 transmits and receives signals to and from the specific pad 220 of the controller 200.

As described above, even if the specifications of the microcomputer 218 provided in the controller 200 are changed and a new hardware configuration for maintaining the layout of the pad 220 and the provided functions is adopted, the source code 112 can be used as it is as long as the configuration 118 that defines the hardware configuration is prepared. That is, changes in the hardware configuration of the controller 200 can be absorbed by software.

In this manner, even if semiconductor devices such as a microcomputer progress, the physical interface (pad 220) of the controller 200 can be maintained and the software assets can be used as they are. As a result, the interface with the controller 200 is immutable when viewed from any device connected to the controller 200 through the adapter 300, and accordingly the system can be maintained permanently.

<F. Processing Procedure>

Next, a processing procedure for generating the execution code 116 from the source code 12 in the software development device 100 according to the present embodiment will be described.

FIG. 12 is a flowchart showing a processing procedure for generating the execution code 116 from the source code 112 in the software development device 100 according to the present embodiment. Each step shown in FIG. 12 is typically realized when the processor 102 executes the software development program 114.

Referring to FIG. 12, the software development device 100 performs lexical analysis and syntactic analysis on the input source code 112 (step S100). The software development device 100 determines whether or not any of the pads 220 is designated based on the analysis results (step S102). That is, the software development device 100 analyzes the source code 112 to extract a designation for one or more pads 220.

If none of the pads 220 is designated (NO in step S102), the processing of steps S104 and S106 is skipped.

If any of the pads 220 is designated (YES in step S102), the software development device 100 acquires the configuration 118 corresponding to the controller 200 to which the execution code 116 is transferred (step S104), and determines route information required to use the designated pad 220 with reference to the acquired configuration 118 (step S106). This route information includes information for resolving the pin number, the logical port, and the like of the microcomputer connected to the designated pad 220.

Then, the software development device 100 generates object codes in units of modules included in the source code 112 (step S108), combines the object codes, and outputs a result of the combination as the execution code 116 (step S110). Then, the process ends.

In this manner, the software development device 100 generates an execution code including a code corresponding to the extracted designation for the pad 220 with reference to the hardware information (as an example, the configuration 118) of the target controller 200.

<G. Modification Example>

In the above description, for convenience of explanation, a pad has been described as a typical example of a physical interface, but the present disclosure can also be similarly applied to one or more arbitrary physical interfaces (parts of circuits that can transmit and receive signals) without being limited to the term "pad".

<H. Advantages>

According to the present embodiment, the interface to be used among the physical interfaces provided by the controller 200 can be defined in the source code 112, and a mechanism capable of absorbing the difference in the hardware configuration of the controller 200 can be provided. As a result, from the viewpoint of the device connected to the controller 200, the same interface can be maintained regardless of the type of the controller 200, and the software can be used as it is regardless of the change of the controller 200.

It should be considered that the embodiment disclosed is an example in all points and not restrictive. The scope of the present invention is defined by the claims rather than the above description, and is intended to include all modifications within the scope and meaning equivalent to the claims.

EXPLANATIONS OF LETTERS OR NUMERALS

1 IoT SYSTEM
2 EDGE DEVICE
4 HARDWARE DEVICE
100 SOFTWARE DEVELOPMENT DEVICE
102, 202 PROCESSOR
104, 204 MAIN MEMORY
106 INPUT UNIT

108 DISPLAY
110 HARD DISK
112, 112A, 112B SOURCE CODE
114 SOFTWARE DEVELOPMENT PROGRAM
116, 116A EXECUTION CODE
118 CONFIGURATION
120 INTERNAL BUS
122 COMMUNICATION INTERFACE
200 CONTROLLER
206 FLASH MEMORY
210 ARITHMETIC PROCESSING UNIT
212 WIRELESS COMMUNICATION MODULE
214 USB CONTROLLER
216 COMMUNICATION CONTROLLER
218, 218A, 218B MICROCOMPUTER
220 PAD
300 ADAPTER
1121, 1122, 1126 DEFINITION
1123, 1124A, 1124B, 1125, 1127, 1128 INSTRUCTION
1141 PREPROCESSOR
1142 COMPILER
1143 OPTIMIZER
1144 CODE GENERATOR
1161, 1162, 1164, 1166 OBJECT CODE
1163 LIBRARY MODULE
1165 UNIQUE CODE

What is claimed is:

1. A software development device for generating, from a source code, an execution code executed by a controller having one or more pads, the software development device being configured to:
    perform at least one of a lexical analysis or a syntactic analysis of the source code to extract a designation for the one or more pads;
    obtain hardware information of a target controller; and
    generate an execution code including a code corresponding to the extracted designation for the pads with reference to the hardware information,
    wherein the generating the execution code comprises mapping one or more pins of the target controller and the designated one or more pads.

2. The software development device according to claim 1, wherein the pad is a physical interface between the controller and arbitrary hardware.

3. The software development device according to claim 1, wherein the hardware information includes information for specifying a connection relationship between a pin of a semiconductor device mounted on the target controller and the pad.

4. The software development device according to claim 1, wherein the designation for the one or more pads includes identification information for specifying a pad to be used among the one or more pads.

5. The software development device according to claim 1, wherein the generating the execution code comprises using a code unique to the target controller instead of a library module commonly used between controllers.

6. A non-transitory storage medium storing thereon a software development program for generating, from a source code, an execution code executed by a controller having one or more pads, the program, when executed by one or more processors, causing the computer to perform:
    perform at least one of a lexical analysis or a syntactic analysis of the source code to extract a designation for the one or more pads;
    obtainment of hardware information of a target controller; and
    generation of an execution code including a code corresponding to the extracted designation for the pads with reference to the hardware information,
    wherein the generation of the execution code comprises mapping one or more pins of the target controller and the designated one or more pads.

7. The non-transitory storage medium according to claim 6, wherein the pad is a physical interface between the controller and arbitrary hardware.

8. The non-transitory storage medium according to claim 6, wherein the hardware information includes information for specifying a connection relationship between a pin of a semiconductor device mounted on the target controller and the pad.

9. The non-transitory storage medium according to claim 6, wherein the designation for the one or more pads includes identification information for specifying a pad to be used among the one or more pads.

10. The non-transitory storage medium according to claim 6, wherein the step of generating comprises generating the execution code by using a code unique to the target controller instead of a library module commonly used between controllers.

11. A software development method for generating, from a source code, an execution code executed by a controller having one or more pads, comprising:
    perform at least one of a lexical analysis or a syntactic analysis of the source code to extract a designation for the one or more pads;
    obtaining hardware information of a target controller; and
    generating an execution code including a code corresponding to the extracted designation for the pads with reference to the hardware information,
    wherein the generating the execution code comprises mapping one or more pins of the target controller and the designated one or more pads.

12. The software development method according to claim 11, wherein the pad is a physical interface between the controller and arbitrary hardware.

13. The software development method according to claim 11, wherein the hardware information includes information for specifying a connection relationship between a pin of a semiconductor device mounted on the target controller and the pad.

14. The software development method according to claim 11, wherein the designation for the one or more pads includes identification information for specifying a pad to be used among the one or more pads.

15. The software development method according to claim 11, wherein the step of generating comprises generating the execution code by using a code unique to the target controller instead of a library module commonly used between controllers.

16. The software development device according to claim 1, wherein the generating the execution code comprises determining route information including a pin connected to a pad specified by the extracted designation and a logical port connected to the pin.

17. The non-transitory storage medium according to claim 6, wherein the generation of the execution code comprises determining route information including a pin connected to a pad specified by the extracted designation and a logical port connected to the pin.

18. The software development method according to claim 11, wherein the generating the execution code comprises determining route information including a pin connected to a pad specified by the extracted designation and a logical port connected to the pin.

* * * * *